United States Patent [19]
Bastetti et al.

[11] Patent Number: 5,182,129
[45] Date of Patent: Jan. 26, 1993

[54] METHOD OF PREPARING A GLUTAMATE-FREE, SPREADABLE MEAT-CONTAINING CONDIMENT

[75] Inventors: Giuseppe Bastetti; Sergio Veronesi, both of Milan, Italy

[73] Assignee: Barilla G.E.R. F.LLI - Societa Per Azioni, Parma, Italy

[21] Appl. No.: 896,892

[22] Filed: Jun. 10, 1992

[51] Int. Cl.5 .................. A23L 1/313; A23L 1/317
[52] U.S. Cl. .................. 426/589; 426/417; 426/437; 426/509; 426/613; 426/646
[58] Field of Search .......... 426/589, 613, 646, 652, 426/655, 417, 429, 437, 492, 509, 490, 650

[56] References Cited

U.S. PATENT DOCUMENTS

| | | | |
|---|---|---|---|
| 2,013,859 | 9/1935 | MacLachlan | 426/589 X |
| 3,071,475 | 1/1963 | Stohr | 426/613 |
| 3,309,204 | 3/1967 | Helmer et al. | 426/646 |
| 3,424,592 | 1/1969 | Huth | 426/650 X |
| 3,649,301 | 3/1972 | Stump et al. | 426/646 X |
| 4,049,831 | 9/1977 | Ono et al. | 426/72 |
| 4,119,735 | 10/1978 | Maher et al. | 426/646 X |
| 4,165,391 | 8/1979 | Corbett | 426/580 |
| 4,847,099 | 7/1989 | Elinsky | 426/417 X |

FOREIGN PATENT DOCUMENTS 1368669 6/1964 France .
2354057 6/1977 France .

OTHER PUBLICATIONS

Komarik et al., *Food Products Formulary*, vol. 1, 1974, pp. 114–118.

*Primary Examiner*—Arthur L. Corbin
*Attorney, Agent, or Firm*—Sughrue, Mion, Zinn, Macpeak & Seas

[57] ABSTRACT

A method is disclosed wherein amounts of fresh minced meat, high protein concentration meat juice, and vegetable oils are processed by mixing and cooking. The end product is a spreadable, meat-containing condiment having a high protein concentration and being glutamate-free.

13 Claims, No Drawings

METHOD OF PREPARING A GLUTAMATE-FREE, SPREADABLE MEAT-CONTAINING CONDIMENT

This is a continuation of application Ser. No. 07/604,031 filed Oct. 25, 1990, now abandoned.

BACKGROUND OF THE INVENTION

This invention relates to a method of preparing a meat-containing condiment on a commercial scale. More particularly, the invention concerns a spreadable glutamate-free condiment usable as such to prepare meat broths and/or to enhance the sapidity of food and dishes.

In the field of house gastronomy, and more generally in the catering field, there has always existed a demand for a simple, quick, and inexpensive method of preparing so-called meat-based "broths", or of intensifying the flavor of meat in food.

To fill this demand, the related prior art has provided condiments which range from the well-known soup cubes to soup preparations having a similar composition to the cubes and extracts of vegetable origin which are modified chemically to reproduce the meat taste synthetically.

The above products, while imparting the desired sapidity characteristics to soups prepared from them, contain ingredients which tend to be unbalanced from the nutritional standpoint and inferior from the dietetic one, such as sodium chloride (kitchen salt) and sodium glutamate which are usually provided in proportions higher than about 50% and 15% by weight, respectively.

In addition, condiments made in accordance with prior art methods include significant amounts, within the range of about 10 to 20%, of saturated fatty acids of animal origin which affect the nutritional value and digestibility of the broth produced.

Further adverse aspects of the condiments provided heretofore relate to a certain evenness in the taste of the broth, and of dishes prepared therewith, which evenness may result sometimes in the consumer growing accustomed to the peculiar taste imparted by such condiments.

The technical problem that underlies this invention is to provide a method of preparing a meat-containing condiment on a commercial scale, which can enhance the flavor and taste of broths and food cooked therewith, while containing balanced ingredients from the dietetic standpoint.

SUMMARY OF THE INVENTION

This problem is solved according to the invention by a method as indicated being characterized in that it comprises the steps of:
- extracting a meat juice from fresh meat which contains no fats of animal origin and has a content of water-soluble proteins in the 25 to 65% range by weight of the overall weight of the juice and a concentration in the 15° to 90° Brix range;
- mixing said concentrated meat juice with fresh minced meat to provide a mixture having a protein content in the 15 to 35% range by weight of the overall weight of said mixture;
- dispersing at least one fat of vegetable origin through said mixture; and
- cooking said mixture incorporating at least one fat of vegetable origin to a temperature in the 80° to 95° C. range, to yield a spreadable product having a moisture content in the 10 to 20% range by weight and a protein content in the 25 to 40% range by weight of the overall weight of the same.

DETAILED DESCRIPTION OF THE INVENTION

The meat juice, as obtained by hot extraction from fresh meat preferably of beef origin, through a cooking, filtering, and concentrating process to be explained, has the important function of upgrading fresh meat, to which it is added, by raising the protein content of the resulting condiment to values not below 25% by weight of the condiment overall weight.

Specifically, because of the protein contribution from the concentrated meat juice, the condiment prepared with the method of this invention has a content of essential amino acids lysine, tryptophan, and threonine which is clearly higher than that of broth preparations provided by the pertinent prior art, as shown in Table 1 here below.

TABLE 1

| Amino acids | Inventive condiment (% by wt.) | Prior broth preparations (% by wt., ave. values) |
|---|---|---|
| Lysine | 0.15–0.20 | 0.18 |
| Tryptophan | 0.65–0.80 | 0.09 |
| Threonine | 0.60–0.70 | 0.12 |

The aforesaid meat juice constitutes a peculiar element which characterizes the end product from both the nutritional and flavoring standpoints.

The meat juice of this invention is heat extracted from minced fresh meat using a so-called "bain-marie" cooking process to be carried out either under envelope or in a tank.

Bain-marie cooking has the advantage that the water-soluble proteins extracted from the meat during the cooking steps are not dispersed through the heating water.

It has been found that, for an effective extraction of proteins, a temperature in the 78° to 97° C. range, preferably of about 85° C., should be attained at the core of the meat mass being cooked. Within this temperature range, there occurs virtually complete extraction of the meat water-soluble proteins within a time lapse in the 50 to 70 minutes range.

At the end of the protein heat extraction step, from the worn-out meat there is separated a meat juice, that is an aqueous solution of water-soluble proteins, which also contains fats of animal origin and solid meat residues which parted therefrom during the cooking step.

The fats of animal origin and the solid cooking residues are separated from the meat juice, respectively by conventional juice centrifuging and filtering steps, which steps will yield a meat juice having a protein concentration varying between 1° and 15° Brix, preferably between 12° and 14° Brix, according to the extraction procedure followed, respectively under envelope or in a tank.

The meat juice is then subjected to a concentrating step, e.g. in a multiple-effect evaporator set, until a meat juice is obtained which contains no fats of animal origin and has a concentration in the 50° to 90° Brix range, preferably in the 75° to 85° Brix range.

The concentrated meat juice, later to be used in the method of this invention as a protein integrative of meat, has a water-soluble protein content within the by-weight range of 15 to 65%, preferably of from 35 to 65%, of the juice overall weight.

It has been found that, in order to achieve in the end condiment a content of water-soluble proteins of no less than 25%, the fresh meat and upgrading meat juice (protein integrative) should be admixed preferably to the following proportions by weight: 1.5/1 to 3.5/1 parts by weight of juice/part by weight of fresh meat. This admixture will yield a mixture with a protein content in the 15 to 35% range by weight of the overall weight of the same.

Important and characteristic is the use of flavoring fats of vegetable origin to carry out properly the cooking step and to impart the resulting condiment with the desired spreadability and taste.

Under a basic aspect of this invention, the fats employed are those of vegetable origin and comprise the triglycerides of saturated, unsaturated, and polyunsaturated, linear or branched chain fatty acids and mixtures thereof. Among the preferred fatty acids are those having a number of carbon atoms in the 18 to 20 range. Mention may be made, by way of example, of oleic, linoleic, arachidonic and linolenic acids as contained in the following vegetable oils: olive, peanut, sunflower seed, soybean, maize, coconut, palm oils, etc.

The flavored fats of vegetable origin according to this invention are prepared by heat extracting the natural flavors contained in chopped fresh vegetables using at least one of said vegetable oils.

The preferred vegetables are carrots, celery, and onions.

More specifically, this extraction is carried out by heat treating (browning) the vegetables in those same vegetable oils, using conventional techniques and a temperature range of 95° to 110° C. for a time period varying between 15 and 30 minutes.

In general, at the preferred temperature of 105° C., a time period of 20 minutes will be adequate to virtually fully extract the natural flavors present in the vegetables.

The worn-out vegetables are separated by filtration from the flavored vegetable fat which is then cooled down to room temperature and subjected to a densifying and homogenizing step in conventional rotating arm kneading equipment.

The physio-chemical characteristics of the flavored vegetable fat are specially important to the implementation to the subsequent fresh minced meat cooking step, to which the vegetable fat will be added.

The flavored vegetable fats of this invention are, in fact, material to the provision of a condiment which has optimum organoleptic characteristics.

The flavored vegetable fat is dispersed homogeneously through the meat-concentrated juice mixture, prior to the cooking steps and within the same vessel as provided therefor, through a mixing operation which is quite conventional.

It has been found that optimum consistency characteristics can be achieved for the mixture by using 15 to 65 parts by weight of the flavored vegetable fat per 100 parts by weight of the fresh meat-concentrated juice mixture.

The resulting mixture from that addition will include, therefore, 15 to 40% by weight of the aforesaid flavored vegetable fats, preferably from 25 to 40%.

For the sake of a right balance of the inventive condiment, of its stability over time and its organoleptic characteristics, it has been found preferable and advantageous to incorporate, to the aforesaid mixture including fresh minced meat, concentrated meat juice and flavored vegetable fats, and ahead of the cooking step, an amount of kitchen salt varying between 3 and 20% by weight of the mixture overall weight.

The cooking step is carried out in a conventional cooker at a temperature in the 80° to 95° C. range for a time period in the 40 to 60 minutes range, operating preferably at 85° C. for 50 minutes.

During the cooking process, the mixture of ingredients is stirred slowly and continuously in order to provide for even optimal cooking of the fresh meat and further concentration of the meat juice present in the mixture.

During the cooking steps, moreover, the viscous characteristics of the mixture are advantageously adjusted to optimum values, thanks to the flavored vegetable fat contributing materially toward its workability.

To further enhance the sapid characteristics of the condiment so obtained, or to impart special flavors and tastes thereto, the method of this invention provides for an additional step of incorporating pot-herbs to the mixture.

Such herbs may be either added during the cooking step or at the end thereof in amounts of 0.3 to 1.0% by weight referred to the overall weight of the end condiment obtained.

The meat-containing condiment prepared in accordance with the method of this invention has an average composition as shown in Table 2 here below.

TABLE 2

| Components | % |
|---|---|
| Proteins | 25–40 |
| Flavored vegetable fats | 20–40 |
| Moisture | 10–20 |
| Ashes | 10–37 |
| Kitchen salt | 3–25 |
| Pot-herbs | .3–1.0 |

In addition, the condiment thus obtained has, to advantage, a value of Aw or water activity within the range of 0.60 to 0.65, that is adequate to provide for the condiment a shelf life at room temperature of no less than 18–24 months.

Further advantages and features of the method according to this invention, and of the condiment yielded thereby, will become more clearly apparent from the following detailed description of some examples thereof, given by way of illustration and not of limitation.

EXAMPLE 1

100 kg of fresh meat of beef origin was subjected to heat extraction of the water-soluble proteins at a temperature of 90° C. for about 50 minutes, using the bain-marie cooking technique under envelope.

The juice so obtained was then subjected to conventional filtering and centrifuging steps, at the end whereof 12.5 kg was obtained of a juice having a concentration of 12° Brix.

This juice was subsequently subjected to concentration in a three vacuum evaporating stage Multiterm system from Alfa-Laval operated at 50°, 85°, and 120° C., respectively. Thus, 4.2 kg juice was obtained having a concentration of 75° Brix and containing 60.7% by weight of water-soluble proteins.

The resulting concentrated juice was then added to 2.6 kg fresh minced beef meat with which it was mixed intimately using conventional kneading operations.

4 kg of vegetable palm oil was added separately to 1 kg of previously chopped carrots, celery, and onions.

The mixture obtained was then subjected to a browning step at a temperature of about 100° C. for 20 minutes to yield 4.5 kg of flavored vegetable fat which is subjected to cooling followed by homogenization in conventional rotating arm equipment.

The vegetable fat thus obtained was added to the mixture of minced fresh meat and concentrated juice to yield a mixture which, after adding 0.6 kg of kitchen salt, is subjected to a cooking step at 85° C. for about 50 minutes.

At the end of the cooking step of this mixture, as carried out while stirring continuously, a condiment was obtained whose composition, in terms of weight percent of the overall weight thereof, is set forth hereinafter in Table 3 (Condiment 1).

EXAMPLE 2

150 kg of fresh meat of beef origin was subjected to heat extraction of the water-soluble proteins at a temperature of 85° C. for about 60 minutes, using the bain-marie cooking technique under envelope.

The resulting juice was then subjected to conventional filtering and centrifuging steps which yielded 18.2 kg of a juice at a concentration of about 14° Brix.

This juice was then concentrated according to the procedure specified in Example 1 above to yield 5.5 kg of a juice at a concentration of 70° Brix containing 58.7% by weight of water-soluble proteins.

The resulting concentrated juice was then added to 2.4 kg of minced fresh beef meat wherewith it is mixed intimately by conventional kneading operations.

3 kg of refined olive oil was added separately to 0.5 kg of previously chopped carrots, celery, and onions.

The mixture obtained was then subjected to browning at a temperature of about 105° C. for 15 minutes to yield 3.2 kg of flavored vegetable fat which is then cooled and homogenized in conventional rotating arm equipment.

The flavored vegetable fat thus obtained was added to the mixture of minced fresh meat and concentrated juice to yield a mixture which, following the addition thereto of 1.2 kg of kitchen salt, is subjected to cooking at 90° C. for about 45 minutes.

On completion of this mixture cooking step, to be carried out under continuous stirring, a condiment was obtained whose composition, in terms as weight percent of the overall weight thereof is set forth hereinafter in Table 3 (Condiment 2).

EXAMPLE 3

210 kg of fresh meat of beef origin was subjected to heat extraction of water-soluble proteins at a temperature of 95° C. for about 50 minutes, using the bain-marie cooking technique under envelope.

The juice thus obtained was then subjected to conventional filtering and centrifuging steps, at the end of which 20 kg of a juice at a concentration of about 12° Brix was obtained.

Thereafter, the juice was concentrated using the same procedure as specified in Example 1, to yield 6.7 kg of a juice at a concentration of 80° Brix containing 62.7% by weight of water-soluble proteins.

The concentrated juice so processed was then added to 2.0 kg of minced fresh beef meat with which it is mixed intimately using conventional kneading operations.

3.7 kg of refined maize oil was then added separately to 0.6 kg of carrots, celery, and onions, as previously chopped.

The resulting mixture was next subjected to browning at a temperature of about 95° C. for 30 minutes to yield 3.4 kg of flavored vegetable fat which is subjected to cooling followed by homogenization in conventional rotating arm equipment.

The flavored vegetable fat so processed was added to the mixture of minced fresh meat and concentrated juice to yield a mixture which, following the addition of 2.0 kg of kitchen salt, is subjected to cooking at 95° C. for about 40 minutes.

At the end of this mixture cooking step, to be carried out under continuous stirring, a condiment was obtained whose composition in by-weight percent of its overall weight is set forth in Table 3 here below (Condiment 3).

TABLE 3

| Components (% by weight) | Condiment 1 | Condiment 2 | Condiment 3 |
|---|---|---|---|
| Proteins | 28 | 35 | 40 |
| Vegetable fats | 30 | 22 | 25 |
| Moisture | 20 | 18 | 10 |
| Ashes | 17 | 15 | 15 |
| Salt | 5 | 10 | 10 |

The following Table 4 sets out instead the contents of essential amino acid that the above Condiments 1, 2 and 3 have shown on analysis. The numerals shown therein indicate the percent by weight of each amino acid referred to the overall weight of the condiment.

TABLE 4

| Amino acid | Condiment 1 | Condiment 2 | Condiment 3 |
|---|---|---|---|
| Lysine | 0.18 | 0.20 | 0.15 |
| Tryptophan | 0.70 | 0.75 | 0.65 |
| Threonine | 0.50 | 0.68 | 0.60 |

The method of this invention is advantageously useful in the preparation of a meat-containing condiment which is spreadable and balanced from the nutritional and dietetic standpoints. This thanks to the absence of glutamate, chemically modified extracts of animal or vegetable origin, and to the its low content of kitchen salt and concurrent high content of water soluble proteins, to be extracted from meat without in any way processing it chemically.

By virtue of its creamy consistency, the condiment of this invention also lends itself to advantage for a range of different presentations to the consumer in jar, tube forms etc. Furthermore, it may be either used for preparing meat broths or for savoring food and dishes on which it can be spread directly.

What is claimed is:

1. A method of preparing a meat-containing condiment on a commercial scale, which condiment is spreadable and glutamate-free, comprising the steps of:
heating fresh meat to extract a meat juice, free of heating water, from the fresh meat, removing substantially all fats of animal origin and cooking residue from the meat juice and then concentrating the meat juice to provide a concentrated meat juice which has a content of water-soluble proteins in the 25 to 65% range by weight of the overall weight of the juice and a concentration in the 15° to 90° Brix range;

mixing said concentrated meat juice with fresh minced meat to provide a mixture having a protein content in the 15 to 35% range by weight of the overall weight of said mixture;

dispersing at least one vegetable oil through said mixture; and then cooking the vegetable oil containing mixture to a temperature in the 80° to 95° C. range to yield a spreadable meat product having a moisture content in the 10 to 20% range by weight and a protein content in the 25 to 40% range by weight of the overall weight of the product.

2. A method according to claim 1, wherein the meat juice extraction step is carried out by bain-marie cooking of the fresh meat to attain in the mass being cooked, a core temperature in the 78° to 97° C. range.

3. A method according to claim 2, wherein said bain-marie cooking step is carried out for a time period varying from 50 to 70 minutes.

4. A method according to claim 3, wherein said bain-marie cooking step is carried out at 85° C. for a time period of about 50 minutes.

5. A method according to claim 1, wherein said meat juice is admixed with said fresh minced meat in a ratio of juice weight/meat weight varying from 1.5/1 to 3.5/1.

6. A method according to claim 1, wherein said at least one vegetable oil is added to said mixture in the proportion of 15 to 65 parts by weight per 100 parts by weight of said mixture.

7. A method according to claim 1, wherein said at least one vegetable oil is selected from the group consisting of olive oil, peanut oil, maize oil, sunflower seed oil, soybean oil, colza oil, coconut oil and palm oil and mixtures thereof.

8. A method according to claim 1, wherein said at least one vegetable oil includes a natural flavor heat extracted from chopped fresh vegetables.

9. A method according to claim 8, wherein said vegetables are selected from the group consisting of carrots, celery, and onions.

10. A method according to claim 8, wherein said heating step is carried out at a temperature in the 95° to 110° C. range for a time period varying between 15 and 30 minutes.

11. A method according to claim 10, wherein said heating step is carried out at 105° C. for 20 minutes.

12. A method according to claim 1, wherein the method comprises an additional step of adding pot-herbs to said mixture during said cooking step.

13. A method according to claim 12, wherein said pot-herbs are incorporated into said mixture in a proportion of 0.3 to 1.0% by weight of the overall weight of the resulting mixture.

* * * * *